FERROMAGNETIC MATERIAL

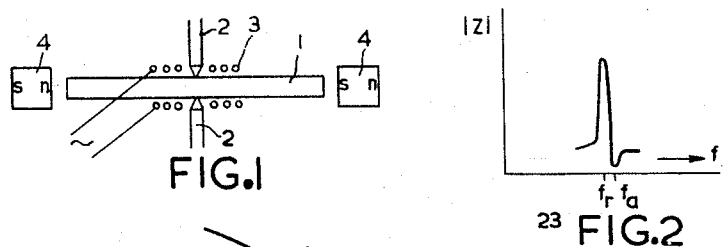
FIG.1
FIG.2
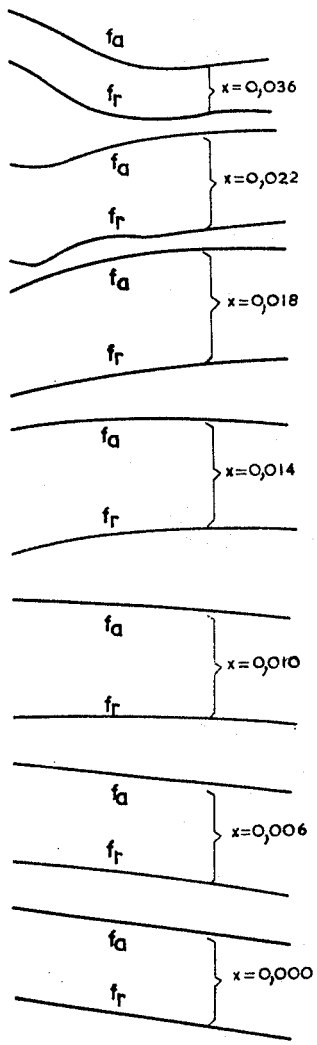
FIG.3

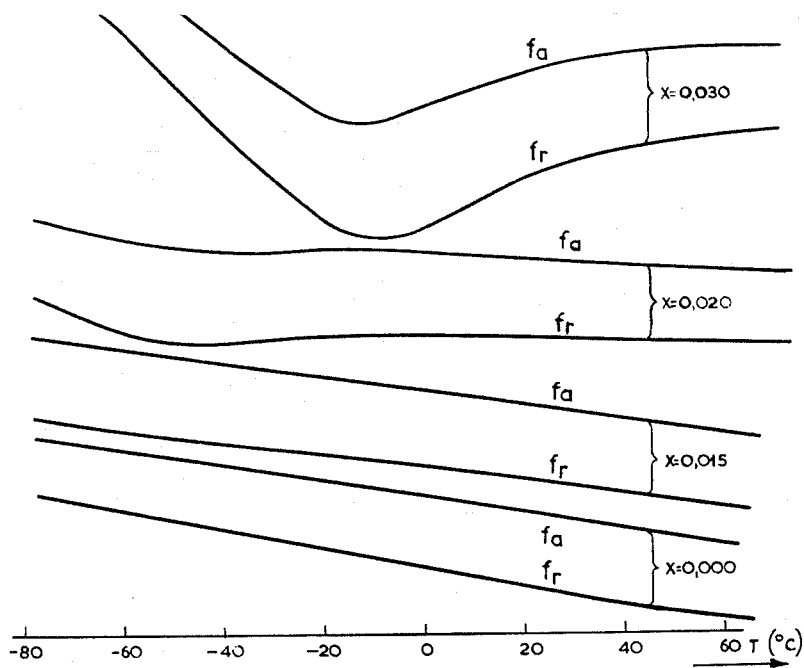
FIG.4
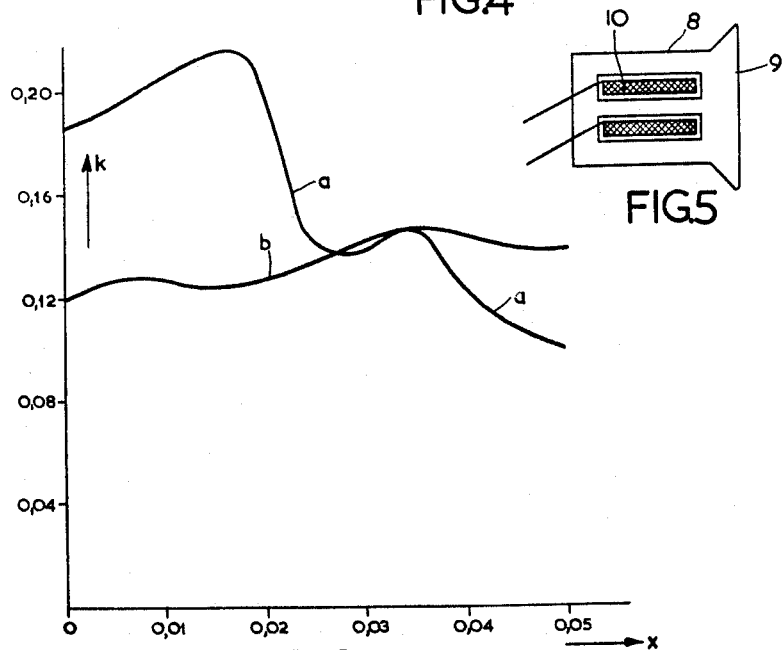
FIG.6
FIG.5

Cornelis Martinus van der Burgt, Eindhoven, Netherlands, assignor, by mesne assignments, to North American Philips Company, Inc., New York, N.Y., a corporation of Delaware
Filed Feb. 12, 1957, Ser. No. 639,724
Claims priority, application Netherlands Feb. 14, 1956
4 Claims. (Cl. 310—26)

My invention relates to ferromagnetic materials and to devices employing such materials. More particularly, my invention relates to oxidic ferromagnetic materials of the type generally referred to as "ferrites."

The "ferrites" are a class of materials corresponding to the formula $MFe_2O_4$, in which M may be one or more divalent metals such as nickel, copper, manganese, magnesium, zinc, cadmium or cobalt and are further, generally, characterized by a spinel structure, i.e. their crystal structure is similar to the spinel $MgAl_2O_4$.

Some of the known ferrites have very high initial permeabilities ($\mu_0$), i.e. several hundred or more, while others are characterized by a low loss factor (tan $\delta$), and some by both a high initial permeability and a low loss factor. Several of the ferrites exhibit the further desirable property of a limited temperature dependence of initial permeability, i.e. a relatively small temperature coefficient of initial permeability which is important in many applications. However, for many purposes even this small temperature coefficient of initial permeability is still too large.

Accordingly, it is a principal object of my invention to provide a new type of ferrite having an exceedingly low temperature coefficient of initial permeability.

A still further object of my invention is to provide a novel device employing a ferromagnetic material according to my invention which is stable in operation over a range of temperatures normally encountered.

These and further objects of my invention will appear as the specification progresses.

In accordance with the invention, I unexpectedly have found that compositions corresponding to the formula:

$$Co_x\{Ni_yZn_{(1-y)}\}_{(1-x)}Fe_2O_4$$

in which $y$ is between 1 and approximately 0.3 and the product $xy$ is between approximately 0.006 and 0.024 have high initial permeabilities, low loss factors and most important, a low temperature coefficient of initial permeability, particularly in the temperature range of about 20° C. to 50° C. I have further found that materials satisfying the condition that $xy$ is between approximately 0.006 and 0.020 are so stable that they are particularly suited for core elements of magneto-strictive vibrators.

The materials according to the invention are prepared in a manner similar to that employed in the manufacture of other ferrites. The oxides of nickel, cobalt, zinc and iron (ferric), or compounds of those metals which form oxides upon heating are mixed and ground to a very fine particle size, e.g. about one micron, and sintered at a temperature of about 1000° to 1400° C.

Preferably, in order to promote homogeniety in the final product, the sintered mixture is reground one or more times and repeatedly resintered. In addition, highly pure reactive materials are preferred.

Alternatively, the reaction mixture may be prepared by the coprecipitation of the metal hydroxides from their salts which has the advantage that the coprecipitate is both intimately mixed and in an extremely fine state of subdivision. In this case, it is desirable to carefully wash out any impurities in the precipitate and to use alkaline hydroxides which form salts which will volatilize during heating. Ammonium hydroxide is a suitable alkaline hydroxide for this purpose.

The invention will be described in connection with the accompanying drawing in which FIG. 1 is a schematic representation of a vibrator according to the invention;

FIG. 2 is a graph showing the relationship between impedance and frequency of a vibrator shown in FIG. 1;

FIG. 3 is a graph showing the frequency-temperature curves of vibrators having cores of nickel ferrite and a composition according to the invention;

FIG. 4 is a graph showing the frequency-temperature curves of vibrators having cores of nickel-zinc ferrite and a composition according to the invention;

FIG. 5 is a sectional view of a magneto-mechanical energy converter according to the invention; and FIG. 6 is a graph showing the magneto-mechanical coupling factor for such an energy converter as a function of the cobalt content.

FIG. 1 shows a magnetostrictive vibrator, of the type used in electrical networks, having a vibrator body 1, clamped in position at its center by means of pin 2 on which a winding 3 is provided. The vibrator body 1 is premagnetized by permanent magnets 4 to a favourable value, for example, a value for which the coupling factor is a maximum. An alternating current applied to winding 3 causes vibrator body 1 to vibrate resulting in an impedance Z whose value is frequency dependent being reflected into the alternating current circuit of which the coil is a part. The value of this impedance as a function of frequency is shown in FIG. 2. At the resonance frequency $f_r$, corresponding to the mechanical resonance frequency of the vibrator body 1, the value of Z, the impedance is at a maximum while at a somewhat higher frequency $f_a$, herein after referred to as the anti-resonance frequency, Z is a minimum.

In electric filter networks in which the selectivity of the impedance characteristic curve $|Z|$ plays an important part, it is desirable that at least one of the frequencies, $f_r$ or $f_a$, remain constant with changes in temperature. In accordance with the invention, if the vibrator body 1 consists of a composition corresponding to the aforesaid formula, not only will the body 1 have a low loss factor tan $\delta$ and a high degree of electrical-mechanical coupling, but the frequencies $f_a$ and $f_r$ will remain substantially constant with changes in temperature. This latter feature is of considerable importance in electrical filter networks since the primary characteristics of the network therefore will be substantially unaffected by changes in temperature.

FIG. 3 shows curves of the frequency dependence of $f_a$ and $f_r$ with temperature of bodies whose composition corresponds to:

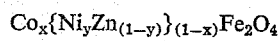
$$Co_xNi_{1-x}Fe_2O_4$$

From this figure it is clearly apparent that, in the temperature range of 20° C. to 50° C., compositions in which $x$ has a value between 0.006 and 0.020 show less variation with temperature than compositions containing no cobalt ($x=0$) or compositions in which $x$ exceeds 0.20. The best results are obtained with compositions in which $x$ has a value between 0.009 and 0.015.

FIG. 4 shows curves of the frequency dependence of $f_a$ and $f_r$ with temperature of bodies whose composition corresponds to:

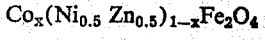
$$Co_x(Ni_{0.5}Zn_{0.5})_{1-x}Fe_2O_4$$

In this case, $x$ should have a value between 0.012 and 0.03 and preferably between 0.018 and 0.03. For other values of $y$ in the graph, correspondingly varied limits of $x$ apply while for smaller values of $y$, the cobalt content must be increased in a substantially inverse relation to $y$ because of the low Curie temperature of the ferrite.

The materials, according to the invention, are also highly suitable for magneto-mechanical energy converters such as are used for producing ultra-sonic oscillations, for example, for under-water gauging. FIG. 5 shows such a converter in which the vibrator body 8 has a halter-like shape having a vibrating end surface 9 for radiating the mechanical oscillations. Electrical oscillations in a region between, for example, of 15 to 500 kc./sec. are supplied to a winding 10 which causes body 8 to vibrate due to the magneto-strictive effect of the material, thus radiating vibration energy by mechanical resonance. The higher the electro-mechanical coupling factor $k$—this is the root of the ratio between the mechanical energy obtained below resonance and the mechanical energy accumulated in the body—the higher the output obtained with the device.

Curve $a$ of FIG. 6 shows the coupling factor $k$ as a function of cobalt percentage $x$, for a nickel-cobalt ferrite, $Co_xNi_{(1-x)}Fe_2O_4$. A distinct improvement is obtained for values of $x$ higher than 0.006 while above $x=0.02$, $k$ drops abruptly. The most sensitive value lies approximately at $x=0.015$, that is to say that 1.5 mol percent of nickel has been substituted by cobalt. A similar behavior is found if, in addition, a portion of the nickel has been substituted by zinc. Curve $b$ of FIG. 6 shows the coupling factor $k$ of a function of cobalt content for a composition $$Co_x\{Ni_{0.5}Zn_{0.5}\}_{1-x}Fe_2O_4 (y-0.5)$$

For obtaining a high coupling factor it is thus necessary to take into account the limits of $x$ referred to above. Similarly, if the value of $y$ in the formula has a different value, correspondingly different values of $x$ must be chosen.

The manner of preparing materials according to the invention will be described in detail in the following examples.

*Example I*

A mixture of 74.0 grams of technically pure nickel oxide, free of cobalt, 159.7 grams of technically pure ferric oxide, and 1.19 grams of technically pure cobalt carbonate ($CoCO_3$) with the addition of about 90% by weight (0.21 litres) of water, was ground in a ball-mill for 18 hours. After drying for 16 hours, pastilles were molded at a pressure of 100 atms. with the addition of 10% by weight of water. After being heated up at a rate of 200° C. per hour the pastilles were sintered at a temperature of about 950° C. in air and subsequently cooled down within a period of 16 hours. The pastilles were reground in a ball-mill, with the addition of about 70% by weight of water, for 18 hours. The resultant "sintered powder" has a molecular composition of $Ni_{0.990}Co_{0.010}Fe_2O_4$.

As a rule, for mass production, the initial material will be nickel oxide which is technically pure, but not free of cobalt, the percentage of cobalt carbonate thus being chosen correspondingly smaller. It is also possible to start from nickel oxide which is technically pure, but not free of cobalt, which is mixed with corresponding amounts of technically pure ferric oxide, so that by the above-mentioned method a sintered powder is obtained having a molecular composition $Ni_{1-x_1}Co_{x_1}Fe_2O_4$. With the addition of cobalt carbonate, a sintered powder can be obtained with the above method having a molecular composition $Ni_{1-x_2}Co_{x_2}Fe_2O_4$.

If a mixture of the latter two sintered powders, in the correct ratio, is ground for 18 hours in a ball-mill, with the addition of 70% by weight of water, a powder is obtained having a mean molecular composition $$Ni_{0.990}Co_{0.010}Fe_2O_4$$

The "sintered powder" obtained by either of the aforesaid methods was molded into a plurality of rings each having an outer diameter of 35 mms. and an inner diameter of 25 mms. by adding to the mixture 10% by weight of a 2% ammonium alginate solution as a binder and pressing the rings from the mixture at a pressure of 500 atms. After heating up at a rate of 200° C. per hours., the rings were sintered at a temperature of about 1260° C. in an atmosphere of oxygen for 2 hours. After cooling for 16 hours, rings were obtained having an outer diameter of about 28.5 mms. and an inner diameter of about 20.5 mms., the apparent density being equal to about 4.6 gm./cm.³ and the chemical composition being $$Ni_{0.990}Co_{0.010}Fe_2O_4$$

The resonance frequency $f_r$ and the anti-resonance frequency $f_a$, measured on the ring magnetized at remanence ranging within a temperature interval of 5°–80° C. as indicated in the following table:

| Temperature, ° C. | 5 | 20 | 30 | 40 | 60 | 80 |
|---|---|---|---|---|---|---|
| $f_r$=67.40 kc./sec ........ c./sec.. | +0 | 0 | −3 | −11 | −37 | −72 |
| $f_a$=68.85 kc./sec ........ c./sec.. | +27 | 0 | −20 | −40 | −88 | −138 |

*Example II*

A similar ring manufactured by the same manufacturing method as in Example I, but having a higher percentage of cobalt oxide, so that the chemical composition is $Ni_{0.986}Co_{0.014}Fe_2O_4$, yielded the following measurements.

| Temperature, ° C. | 5 | 20 | 30 | 40 | 60 | 80 |
|---|---|---|---|---|---|---|
| $f_r$=64.10 kc./s ........ c./s.. | −45 | +0 | +32 | +51 | +71 | +67 |
| $f_a$=65.57 kc./s ........ c./s.. | −33 | +0 | +9 | +13 | +6 | −39 |

As compared therewith, a similar ring of cobaltless nickelferrite shows, from 20° to 40° C., a frequency variation of −100 c./s. in the resonance frequency $f_r$ and of −85 c./s. in the anti-resonance frequency $f_a$.

*Example III*

A similar ring manufactured by the same manufacturing method as in Example I, but in which half of the nickel-oxide had been substituted by an equal mol of zinc-oxide, while also so high a percentage of cobalt was used, that the chemical composition of the ring was: $Ni_{0.49}Zn_{0.49}Co_{0.02}Fe_2O_4$, yielded the following measurements:

| Temperature, ° C. | 5 | 20 | 30 | 40 | 60 | 80 |
|---|---|---|---|---|---|---|
| $f_r$=77.90 kc./s ........ c./s.. | +11 | +0 | −7 | −15 | −33 | −62 |
| $f_a$=78.05 kc./s ........ c./s.. | +3 | +0 | −4 | −10 | −27 | −47 |

In comparison therewith, a similar ring of cobaltless nickel zinc ferrite, shows, from 20° to 40° C., a frequency variation of −140 c./s. in $f_r$ and of −125 c./s. in $f_a$.

*Example IV*

A similar ring of a composition such that the chemical formula is approximately: $\{Ni_{0.8}Zn_{0.2}\}_{0.9834}Co_{0.0166}Fe_2O_4$ yielded the following measurements:

| Temperature, ° C. | 5 | 20 | 30 | 40 | 60 | 80 |
|---|---|---|---|---|---|---|
| $f_r$=73.20 kc./s ........ c./s.. | +9 | +0 | −12 | −26 | −63 | −116 |
| $f_a$=74.28 kc./s ........ c./s.. | +23 | +0 | −17 | −36 | −88 | −156 |

Example V

A similar ring, but of a composition such that the chemical formula is approximately:

$$\{Ni_{0.8}Zn_{0.2}\}_{0.9784}Co_{0.0216}Fe_2O_4$$

yielded the following measurements:

| Temperature, °C | 5 | 20 | 30 | 40 | 60 | 80 |
|---|---|---|---|---|---|---|
| $f_r$=71.40 kc./s............c./s.. | −74 | +0 | +36 | +58 | +75 | +63 |
| $f_a$=72.63 kc./s............c./s.. | −44 | +0 | +2 | −1 | −20 | −55 |

It has been found that the corresponding cobaltless nickel zinc ferrite yielded from 20° to 40° C., a frequency variation of −115 c./s. in $f_r$ and of −100 c./s. in $f_a$.

The following table lists other data on similar compositions.

TABLE

| $x$ | $y$ | $(\mu_0)_{max}$ | $(\mu_0)_{min}$ | $(\mu_0)_{av}=\dfrac{(\mu_0)_{max}+(\mu_0)_{min}}{2}$ |
|---|---|---|---|---|
| 0.000 | 1.0 | 31.5 | 30.5 | 31.0 |
| 0.006 | 1.0 | 28.8 | 28.2 | 28.5 |
| 0.010 | 1.0 | 28.2 | 28.1 | 28.15 |
| 0.014 | 1.0 | 27.3 | 27.25 | 27.25 |
| 0.018 | 1.0 | 24.9 | 24.6 | 24.75 |
| 0.022 | 1.0 | 21.6 | 21.6 | 21.6 |
| 0.026 | 1.0 | 19.8 | 19.6 | 19.7 |
| 0.036 | 1.0 | 15.9 | 13.5 | 14.7 |
| 0.0048 | 0.8 | 93.5 | 88.9 | 91.2 |
| 0.0166 | 0.8 | 110.0 | 109.4 | 109.7 |
| 0.0216 | 0.8 | 112.5 | 112.5 | 112.5 |
| 0.000 | 0.5 | 412 | 362 | 387 |
| 0.010 | 0.5 | 395 | 365 | 380 |
| 0.015 | 0.5 | 320 | 294 | 307 |
| 0.020 | 0.5 | 311 | 296 | 303 |
| 0.030 | 0.5 | 326 | 320 | 323 |
| 0.040 | 0.5 | 275 | 265 | 27 |
| 0.080 | 0.5 | 290 | 155 | 222 |
| 0.100 | 0.5 | 266 | 122 | 194 |

| $x$ | $y$ | Temp. factor F×10⁶ | tan δ (percent) | $\dfrac{(\tan\delta)}{\mu_0}\times 10^6$ |
|---|---|---|---|---|
| 0.000 | 1.0 | 35 | 1.14 | 450 |
| 0.006 | 1.0 | 25 | 1.0 | 440 |
| 0.010 | 1.0 | 4 | 0.8 | 367 |
| 0.014 | 1.0 | 2 | 0.74 | 356 |
| 0.018 | 1.0 | 16 | 0.63 | 258 |
| 0.022 | 1.0 | 0 | 0.53 | 272 |
| 0.026 | 1.0 | 17 | 0.48 | 258 |
| 0.036 | 1.0 | 370 | 0.73 | 448 |
| 0.0048 | 0.8 | 18.5 | 1.60 | 180 |
| 0.0166 | 0.8 | 1.7 | 1.62 | 146 |
| 0.0216 | 0.8 | 0 | 1.42 | 126 |
| 0.000 | 0.5 | 11 | 1.98 | 55 |
| 0.010 | 0.5 | 7 | 1.57 | 43 |
| 0.015 | 0.5 | 9 | 1.67 | 52 |
| 0.020 | 0.5 | 5 | 1.75 | 59 |
| 0.030 | 0.5 | 2 | 1.38 | 43 |
| 0.040 | 0.5 | 5 | 1.33 | 48 |
| 0.080 | 0.5 | 91 | 1.28 | 83 |
| 0.100 | 0.5 | 128 | 1.47 | 124 |

The table illustrates the influence of a small quantity of cobalt on the so-called "temperature factor F," i.e. the temperature coefficient ($T_c$) of the initial permeability ($\mu_0$) divided by the initial permeability. The factor F is, from a technical standpoint, a more important factor than the temperature coefficient itself, since it is not affected by the presence of any air-gaps in the magnetic circuit. Since the initial permeability tends to vary erratically as a function of the temperature in a given temperature range, i.e. it has one or more maxima and/or minima, the temperature factor should be defined by the following formula:

$$\frac{T_c}{(\mu_0)_{av}} = \frac{(\mu_0)_{max}-(\mu_0)_{min}}{(\mu_0)^2_{av}(t_2-t_1)}$$

in which $(\mu_0)_{max}$ and $(\mu_0)_{min}$ are the maximum and minimum values of initial permeability, respectively, in the range of temperatures $t_2$ and $t_1$, and $(\mu_0)_{av}$ represents the average value of initial permeability in this range.

While I have described my invention in connection with specific embodiments thereof, the invention is defined in the appended claims which are to be construed as broadly as permissible.

What is claimed is:

1. A ferromagnetic material particularly adapted for a magnetostrictive vibrator consisting essentially of a material corresponding to the formula:

$$Co_x\{Ni_yZn_{(1-y)}\}_{(1-x)}Fe_2O_4$$

wherein $y$ has a value between 1 and about 0.3 and the value of the product $xy$ is between about 0.006 and 0.024, said material being formed by mixing cobalt, nickel, zinc and ferric oxides in proportions corresponding to said formula, and sintering said mixture at a temperature of about 1000° C. to 1400° C., said material having a loss factor (tan δ) less than about 1.62 percent and a temperature factor of initial permeability ($T_c/\mu_0$) of less than about $25\times 10^{-6}$.

2. A ferromagneic material particularly adapted for a magnetostrictive vibrator consisting essentially of a material corresponding to the formula:

$$Co_x\{Ni_yZn_{(1-y)}\}_{(1-x)}Fe_2O_4$$

wherein $y$ has a value of between 1 and about 0.3 and the value of the product $xy$ is between about 0.006 and 0.020, said material being formed by mixing cobalt, nickel, zinc and ferric oxides in proportions corresponding to said formula, and sintering said mixture at a temperature of about 1000° C. and 1400° C., said material having a loss factor (tan δ) less than about 1.62 percent and a temperature factor of initial permeability ($T_c/\mu_0$) of less than about $25\times 10^{-6}$.

3. In a magnostrictive vibrator having in combination a vibrator body capable of being magnetized by a permanent magnet, means for securing said vibrator body in a fixed position, means for coupling an alternating current to said body to thereby vibrate said body and means for reflecting the impedance resulting from the vibrations of said body into said alternating current coupling means the improvement which consists of forming the vibrator body from a ferromagnetic composition having a loss factor (tan δ) less than about 1.62 and a temperature factor of initial permeability less than about $25\times 10^{-6}$ consisting essentially of a material corresponding to the formula: $Co_x\{Ni_yZn_{(1-y)}\}Fe_2O_4$, wherein $y$ has a value between 1 and about 0.3 and the value of the product $xy$ is between about 0.006 and 0.024.

4. A ferromagnetic composition particularly adapted for a magnetostrictive vibrator consisting essentially of a material corresponding to the formula $$Co_x\{Ni_yZn_{(1-y)}\}_{1-x}Fe_2O_4$$

wherein $y$ has a value of 0.5 and $x$ has a value of about 0.018 to about 0.030, said material being obtained by forming a mixture of cobalt, nickel, zinc, and ferric oxides in proportions corresponding to said formula, and sintering said mixture at a temperature of about 1000° C. to 1400° C., said material having a loss factor (tan δ) less than about 1.62 and a temperature factor of initial permeability ($T_c/\mu_0$) less than about $25\times 10^{-6}$.

References Cited in the file of this patent

UNITED STATES PATENTS

| 2,692,344 | Van Der Burgt et al. | Oct. 19, 1954 |
| 2,723,239 | Harvey | Nov. 8, 1955 |
| 2,736,708 | Crowley et al. | Feb. 28, 1956 |

FOREIGN PATENTS

| 751,623 | Great Britain | July 4, 1956 |
| 756,374 | Great Britain | Sept. 5, 1956 |

OTHER REFERENCES

Weil: Comptes Rendus, vol. 234, p. 1352, Mar. 24, 1952.

"Magnetic Materials in the Electrical Industry," by Bardell, Philosophical Library, N.Y., 1955, p. 272.